(12) United States Patent
Son (10) Patent No.: US 8,894,246 B2
(45) Date of Patent: Nov. 25, 2014

(54) LIGHT EMITTING APPARATUS AND LIGHT EMITTING UNIT

(75) Inventor: Won Jin Son, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/599,304

(22) Filed: Aug. 30, 2012

(65) Prior Publication Data

US 2012/0320598 A1    Dec. 20, 2012

Related U.S. Application Data

(63) Continuation of application No. 12/567,995, filed on Sep. 28, 2009, now Pat. No. 8,272,764.

(30) Foreign Application Priority Data

Sep. 29, 2008    (KR) .................. 10-2008-0095451

(51) Int. Cl.
| | | |
|---|---|---|
| *F21V 29/00* | (2006.01) | |
| *F21V 17/16* | (2006.01) | |
| *F21V 17/10* | (2006.01) | |
| *F21S 4/00* | (2006.01) | |
| *H05B 33/08* | (2006.01) | |
| *F21K 99/00* | (2010.01) | |
| *F21V 3/02* | (2006.01) | |
| *F21Y 103/00* | (2006.01) | |
| *F21Y 105/00* | (2006.01) | |
| *F21Y 101/02* | (2006.01) | |

(52) U.S. Cl.
CPC ............. *F21V 29/004* (2013.01); *F21V 17/164* (2013.01); *F21V 17/104* (2013.01); *F21S 4/003* (2013.01); *F21Y 2103/003* (2013.01); *F21V 29/225* (2013.01); *Y02B 20/386* (2013.01); *F21Y 2105/001* (2013.01); *F21Y 2101/02* (2013.01); *H05B 33/0803* (2013.01); *F21K 9/17* (2013.01); *F21V 3/02* (2013.01); *F21V 29/244* (2013.01); *Y02B 20/383* (2013.01)

USPC .......................................... 362/294; 362/362

(58) Field of Classification Search
USPC ............... 315/35, 52, 291, 294; 362/294, 612
See application file for complete search history.

(56) References Cited

U.S. PATENT DOCUMENTS

| 6,578,979 B2 | 6/2003 | Truttmann-Bättig |
| 8,040,676 B2 | 10/2011 | Kluge |

(Continued)

FOREIGN PATENT DOCUMENTS

| CN | 2010/34306 | * | 3/2008 |
| CN | 201034306 Y | | 3/2008 |

(Continued)

OTHER PUBLICATIONS

Office Action dated Aug. 27, 2012 in Chinese Application No. 200980133952.8, filed Sep. 25, 2009.

(Continued)

*Primary Examiner* — Tung X Le
*Assistant Examiner* — Jonathan Cooper
(74) *Attorney, Agent, or Firm* — Saliwanchik, Lloyd & Eisenschenk (57) ABSTRACT

A fluorescent lamp type light emitting apparatus is provided. The light emitting apparatus comprises a cover, a light emitting module, radiation pads, and cap parts. The cover comprises a first cover and a transmissive second cover coupled to the first cover. The light emitting module comprises a plurality of light emitting diodes in the cover. The radiation pads are disposed on the light emitting module. The cap parts comprise electrode terminals at both ends of the cover.

15 Claims, 8 Drawing Sheets

(56) References Cited

U.S. PATENT DOCUMENTS

| | | | |
|---|---|---|---|
| 2004/0252501 A1 | 12/2004 | Moriyama et al. | |
| 2005/0169596 A1* | 8/2005 | Hamasaki et al. | 385/137 |
| 2007/0285922 A1 | 12/2007 | Chen | |
| 2008/0106911 A1* | 5/2008 | Park et al. | 362/612 |
| 2008/0304267 A1* | 12/2008 | Lin | 362/294 |

FOREIGN PATENT DOCUMENTS

| | | |
|---|---|---|
| CN | 201100548 Y | 8/2008 |
| DE | 20102529 U1 | 5/2001 |
| DE | 20-2006-013053 U1 | 3/2007 |
| EP | 1191277 A2 | 3/2002 |
| JP | 06-054103 U | 7/1994 |
| JP | 2002-141555 A | 5/2002 |
| JP | 2002-197901 A | 7/2002 |
| JP | 2004-109407 A | 4/2004 |
| JP | 3121894 U | 6/2006 |
| JP | 2007-012322 A | 1/2007 |
| JP | 2007-273213 A | 10/2007 |
| JP | 2007-280739 A | 10/2007 |
| JP | 3143315 U | 7/2008 |
| KR | 100657590 B1 | 12/2006 |
| KR | 10-2008-0005762 A | 1/2008 |
| KR | 10-2008-0012577 A | 2/2008 |
| KR | 10-0821975 B1 | 4/2008 |
| KR | 100821975 * | 4/2008 |
| KR | 10-2008-0047521 A | 5/2008 |
| KR | 10-0844538 B1 | 7/2008 |
| KR | 20-2008-00002511 | 7/2008 |
| WO | WO-2007/090292 A1 | 8/2007 |
| WO | WO-2007/107601 A2 | 9/2007 |
| WO | WO-2007/143991 A1 | 12/2007 |
| WO | WO-2009/035203 A1 | 3/2009 |
| WO | WO 2009035203 * | 3/2009 |

OTHER PUBLICATIONS

Supplementary European Search Report dated Dec. 17, 2012 in European Application No. 09816460.1, filed Sep. 25, 2009.
Partial European Search Report dated Dec. 14, 2012 in European Application No. 12190604.4.
Office Action dated Sep. 10, 2013 in Japanese Application No. 2011-528944, filed Sep. 25, 2009.
Office Action dated Dec. 10, 2013 in European Application No. 12-109-604.4.
Office Action dated Sep. 12, 2014 in Japanese Application No. 2013-212102.

* cited by examiner

LIGHT EMITTING APPARATUS AND LIGHT EMITTING UNIT

CROSS-REFERENCE TO RELATED APPLICATIONS

This application is a continuation of U.S. application Ser. No. 12/567,995, filed Sep. 28, 2009, which claims the benefit under 35 U.S.C. §119 of Korean Patent Application No. 10-2008-0095451, filed Sep. 29, 2008, which are hereby incorporated by reference in their entirety.

BACKGROUND

The present disclosure relates to a fluorescent lamp type light emitting apparatus and a light emitting unit.

Research and development on illuminators has been carried out to improve energy efficiency and satisfy requirements of users. Illuminators, such as incandescent lamps, fluorescent lamps and three-wavelength lamps are convenient to manufacture and use, and are thus very popular, but they are uneconomical due to their short service life and low energy efficiency. To address this limitation, light emitting diode (LED) illuminators, which have improved service life and energy efficiency, have been developed and sold.

Such LED illuminators have 25 W or lower power consumption, and may reduce electricity fees by about 30% or more. In addition, since LED illuminators are semi-permanent, their applications are diverse.

BRIEF SUMMARY

Embodiments provide a fluorescent lamp type light emitting apparatus comprising light emitting diodes.

Embodiments provide a fluorescent lamp type light emitting apparatus that can effectively release heat generated from light emitting diodes to a first cover, and diffuse light through a diffusion second cover.

Embodiments provide a fluorescent lamp type light emitting apparatus that can release heat through a silicon radiation pad of a light emitting module and a first cover.

Embodiments provide a fluorescent lamp type light emitting apparatus that can vary brightness and/or color of a light emitting diode.

Embodiments provide a fluorescent lamp type light emitting apparatus that can control dimming of an LED according to a signal sensed by an optical sensor.

An embodiment provides a light emitting apparatus comprising: a cover comprising a first cover and a second cover coupled to the first cover, wherein the cover is formed in tube shape and at least one of the first cover and second cover is transmissive; a light emitting module comprising a plurality of light emitting diodes in the cover; a plurality of radiation pads on the light emitting module; and cap parts comprising electrode terminals coupled at both ends of the cover.

An embodiment provides a light emitting apparatus comprising: a light emitting module comprising a circuit board and a light emitting diode array under the circuit board; a first cover on the light emitting module; a transmissive cover coupled to the first cover; a diffusion member at the transmissive cover; a plurality of radiation pads on the circuit board of the light emitting module; and a plurality of cap parts at both ends of the first cover and the transmissive cover.

The details of one or more embodiments are set forth in the accompanying drawings and the description below. Other features will be apparent from the description and drawings, and from the claims.

DETAILED DESCRIPTION

Reference will now be made in detail to embodiments of the present disclosure, examples of which are illustrated in the accompanying drawings.

Figure 1:
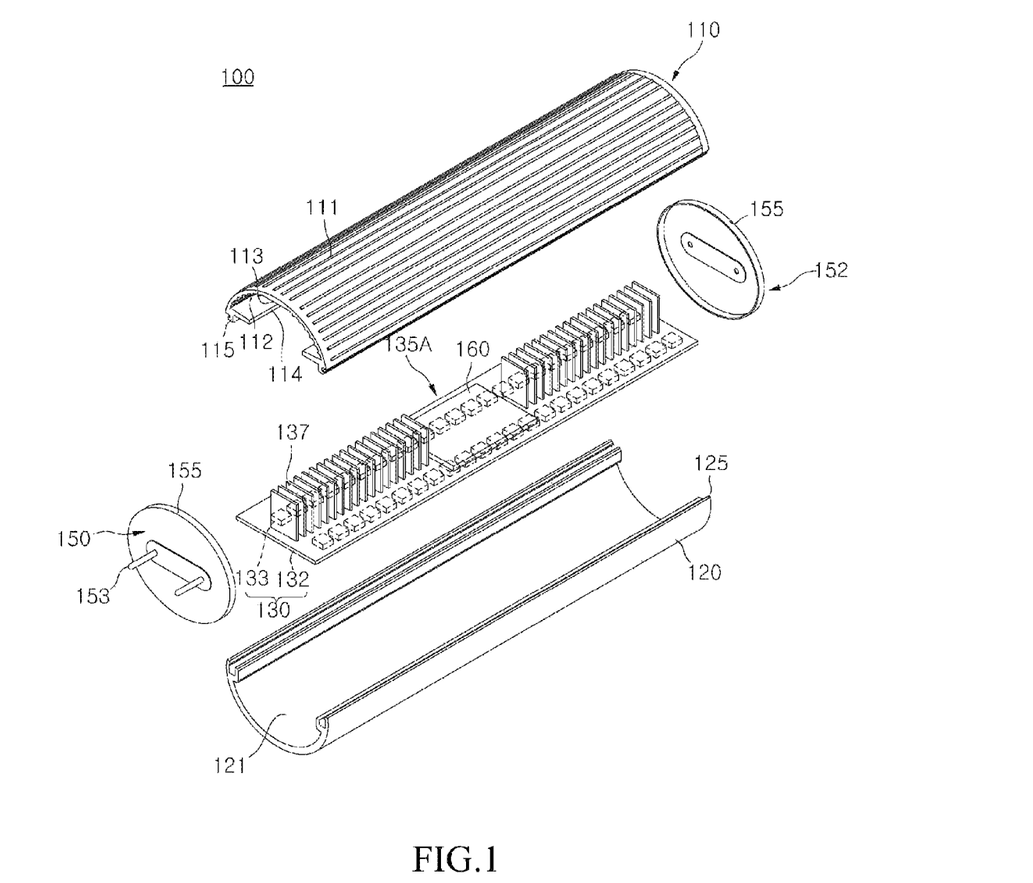
FIG. 1 is an exploded perspective view illustrating a fluorescent lamp type light emitting apparatus according to an embodiment.
Figure 2:
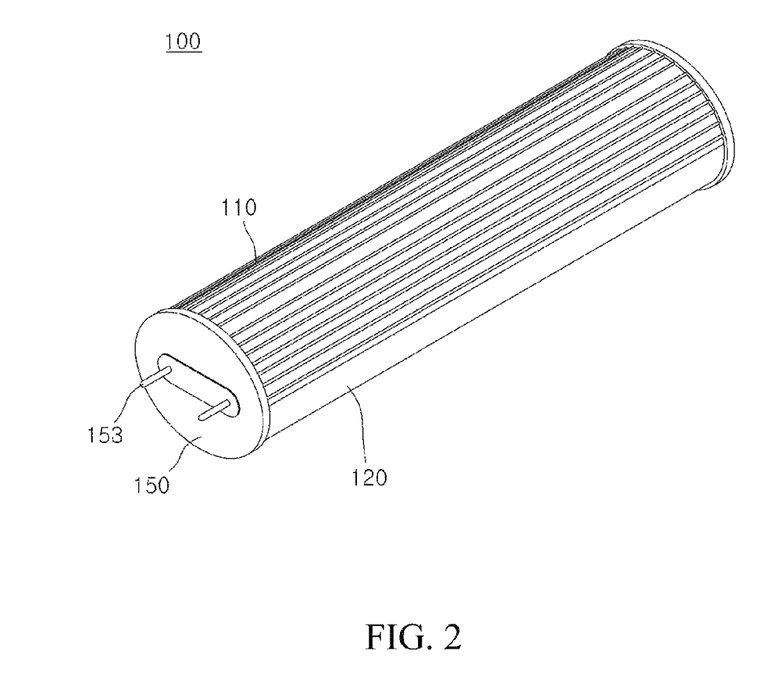
FIG. 2 is a perspective view illustrating the fluorescent lamp type light emitting apparatus of FIG. 1.
Figure 3:
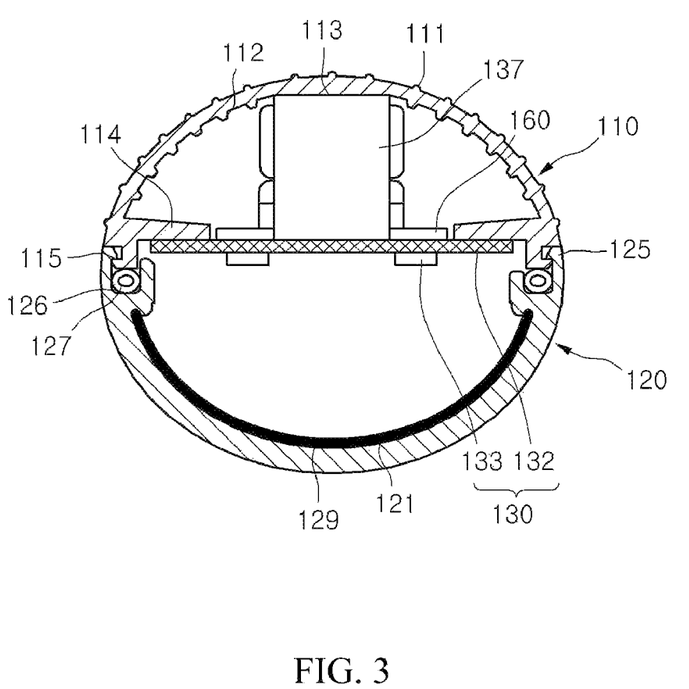
FIG. 3 is a cross-sectional view illustrating the fluorescent lamp type light emitting apparatus of FIG. 2.

FIG. 1 is an exploded perspective view illustrating a fluorescent lamp type light emitting apparatus 100 according to an embodiment, FIG. 2 is a perspective view illustrating the fluorescent lamp type light emitting apparatus 100 of FIG. 1, and FIG. 3 is a cross-sectional view illustrating the fluorescent lamp type light emitting apparatus 100 of FIG. 2.

Referring to FIG. 1, the light emitting apparatus 100 comprises a first cover 110, a second cover 120, a light emitting module 130, and cap parts 150.

The light emitting apparatus 100 may be defined as a straight pipe type cylindrical lamp, a straight pipe type rod lamp, a straight pipe type tube lamp, or a tube type lamp. Hereinafter, the light emitting apparatus 100 will be described as a straight pipe type cylindrical lamp for convenience in description.

The first cover 110 may have a hemispheric shape or a half-cylindrical shape. The first cover 110 may have a length corresponding to a predetermined length of a straight pipe type fluorescent lamp. The first cover 110 is formed as a heat sink cover. The first cover 110 may be formed of metal, e.g., aluminum. A plurality of heat sink pins 111 and 112 protrude from an inner circumference and/or an outer circumference of the first cover 110, and may have the same shape or different shapes from each other, but the shape is not limited thereto.

The heat sink pins 111 and 112 may be disposed in the longitudinal direction of the first cover 110 and/or in the circumferential direction of the first cover 110, but embodiments are not limited thereto.

The first cover 110 can effectively release heat generated from the light emitting module 130 in the full range of the first cover 110.

The second cover 120 is formed as a transmissive front cover. The second cover 120 may have a hemispheric shape or a half-cylindrical shape. The second cover 120 may be formed of light transmissive plastic (e.g. polycarbonate (PC)). An inner circumference 121 of the second cover 120 may be provided with a diffusion member 129 as illustrated in FIG. 3. The diffusion member 129 diffuses light emitted from the light emitting module 130 to inhibit glare caused by light transmitted by the second cover 120. The diffusion member 129 may be a diffusion sheet or be formed by application of a diffusion material, but is not limited thereto.

Coupling protrusions 115 are disposed at both edges of the first cover 110. Coupling grooves 125, which catch the coupling protrusions 115, are disposed at both edges of the second cover 120. The coupling protrusions 115 and the coupling grooves 125 may be coupled in a hook arrangement and be replaced with each other, but are not limited thereto.

Supports 114 protrude inward along lateral edges of the first cover 110, and are parallel to each other.

The light emitting module 130 may be fixed to the bottom surface of the supports 114.

A pad contact 113 is disposed at the center of the inner circumference of the first cover 110. The pad contact 113 is provided with a planar surface that is disposed in the longitudinal direction of the first cover 110 and has a width corresponding to the widths of radiation pads 137.

The light emitting module 130 comprises a circuit board 132 and light emitting diodes 133. The circuit board 132 may comprise one or more metal core printed circuit boards (PCBs) that have a high heat release rate. The circuit board 132 may have a length and a width such that the circuit board 132 can be disposed in the light emitting apparatus 100, but is not limited thereto.

A control module 160 is disposed on the circuit board 132, and comprises a driving circuit and a control circuit, and controls on/off, dimming and color temperature of the light emitting diodes 133. The control module 160 receives DC power through a plurality of power lines that are provided to the circuit board 132.

The bottom of the circuit board 132 is provided with an interconnection pattern, and the light emitting diodes 133 are arrayed on the bottom of the circuit board 132.

The light emitting diodes 133 may be arrayed in at least one line, and be connected to each other in parallel or in series. The number of the connected light emitting diodes 133 may be varied according to a socket for a straight pipe type fluorescent lamp, the luminous intensity of the light emitting apparatus 100, or input power, but is not limited thereto. The circuit board 132 may be provided with a zener diode (not shown) for protecting the light emitting diodes 133.

The light emitting diodes 133 may emit a target light, e.g. white light, or lights emitted from two kinds of light emitting diodes may be mixed to obtain a target light. A target light or light color of the light emitting diodes 133 may be varied, and thus, is not limited. Various packages comprising a dome-type package with a wafer level package (WLP) may be used for the light emitting diodes 133.

The radiation pads 137 may be disposed on the circuit board 132. The radiation pads 137, which are heat conductive pads formed of silicon, may stand vertically on the circuit board 132.

Since the radiation pads 137 are in close contact with the top of the circuit board 132, the radiation pads 137 release heat generated from the circuit board 132, and may release the heat through the first cover 110.

The radiation pads 137 have a width that is less than that of the circuit board 132, and are spaced a predetermined distance from each other. The radiation pads 137 may be arrayed in the first cover 110 at a region except for a region 135A for the control module 160.

The radiation pads 137 conduct heat generated from the circuit board 132 to the first cover 110. The radiation pads 137 may be coupled to the circuit board 132 through a conductive tape, a screw member, or a heat conductive resin.

The radiation pads 137 and the first cover 110 effectively release heat generated from the circuit board 132 to inhibit efficiency deterioration of the light emitting diodes 133 and heat distortion of the second cover 120.

The first cover 110 is coupled to the second cover 120 to form a cover, which protects the light emitting module 130 therein.

The cap parts 150 may be coupled to both ends of the cover having the first cover 110 and the second cover 120, and can be formed of plastic that is electrically insulated and resistant against high temperature. A plurality of electrode terminals 153 protrude outward from each of the cap parts 150, and are electrically connected to the circuit board 132 of the light emitting module 130. The electrode terminals 153 of the cap parts 150 may be connected to the circuit board 132 of the light emitting module 130 through a wire member or connector member, or the electrode terminal 153 may be directly connected to the circuit board 132, but the connection thereof is not limited thereto.

Cover guides 155 are provided to outer circumferences of the cap parts 150, and protrude in ring shape to be in close contact with the outer circumferences of the first cover 110 and the second cover 120. The cover guides 155 may be fitted around both sides of the first cover 110 and the second cover 120.

As described above, the light emitting diodes 133 are provided to the bottom of the circuit board 132 of the light emitting module 130, and the radiation pads 137 and the control module 160 comprising a driver are disposed on the top of the circuit board 132.

The radiation pads 137 may be fixed to the circuit board 132 through a conductive tape, a screw member, or heat conductive resin, and have a predetermined shape and a predetermined area, and are spaced a predetermined distance from each other.

The circuit board 132 of the light emitting module 130 may be fixed to the supports 114 in the first cover 110 through a coupling member such as adhesive or a screw. The radiation pads 137 of the light emitting module 130 may be close to or be in contact with the inner circumference of the first cover 110.

After the light emitting module 130 is coupled to the supports 114 in the first cover 110, the first cover 110 and the second cover 120 are coupled to each other in the straight pipe type in the state where the first cover 110 and the second cover 120 face each other.

The coupling protrusions 115 provided to both edges of the first cover 110 are coupled to the coupling grooves 125 provided to both edges of the second cover 120. The coupling protrusions 115 are disposed in the longitudinal direction of the first cover 110, and the coupling grooves 125 have shapes corresponding to the coupling protrusions 115, in the longitudinal direction of the second cover 120. The coupling protrusions 115 are coupled to the coupling grooves 125 in hook arrangement to constitute the cover formed of the first cover 110 and the second cover 120.

Referring to FIG. 3, a receiving portion 126 is disposed in each of the coupling grooves 125 of the second cover 120 in the longitudinal direction of the second cover 120, and elastic bands 127 are disposed in the receiving portions 126. The elastic band 127 may be provided in plurality in each of the receiving portions 126. When the coupling protrusions 115 of the first cover 110 are inserted into the receiving portions 126, the elastic bands 127 are compressed to transmit their elastic force upward to the coupling protrusions 115, so that the coupling protrusions 115 are caught and coupled to the coupling grooves 125. Since the elastic bands 127 push the coupling protrusions 115 of the first cover 110 to the coupling grooves 125, the first cover 110 is inhibited from being removed from the second cover 120.

Since the coupling protrusions 115 and the coupling grooves 125 are coupled in first cover 110 and the second cover 120, the coupling protrusions 115 and the coupling grooves 125 do not protrude from the outer surface of the cover.

The light emitting apparatus 100 is embodied by coupling the cap parts 150 to both the ends of the first and second cover 110 and 120. The cap parts 150 cover both ends of the light emitting apparatus 100 and allows the electrode terminals 153 to protrude outward.

As described above, the electrode terminals 153 of the cap parts 150 may be connected to the circuit board 132 of the light emitting module 130 through a wire member or connector member, or the electrode terminals 153 may be directly connected to the circuit board 132.

The electrode terminals 153 provided to the cap parts 150 are connected to a socket (not shown) for a fluorescent lamp to supply power to the light emitting apparatus 100.

When power is supplied to the electrode terminals 153 of the light emitting apparatus 100, the light emitting diodes 133 of the light emitting module 130 emit light.

The second cover 120 diffuses light emitted from the light emitting diodes 133 and transmits the light to the outside. Light emitted from the light emitting diodes 133 is diffused uniformly to the whole of an illuminated region by the diffusion member 129 provided to the inner circumference 121 of the second cover 120.

The radiation pads 137 and the first cover 110 having a concave-convex structure release heat emitted from the light emitting diodes 133.

Figure 4:
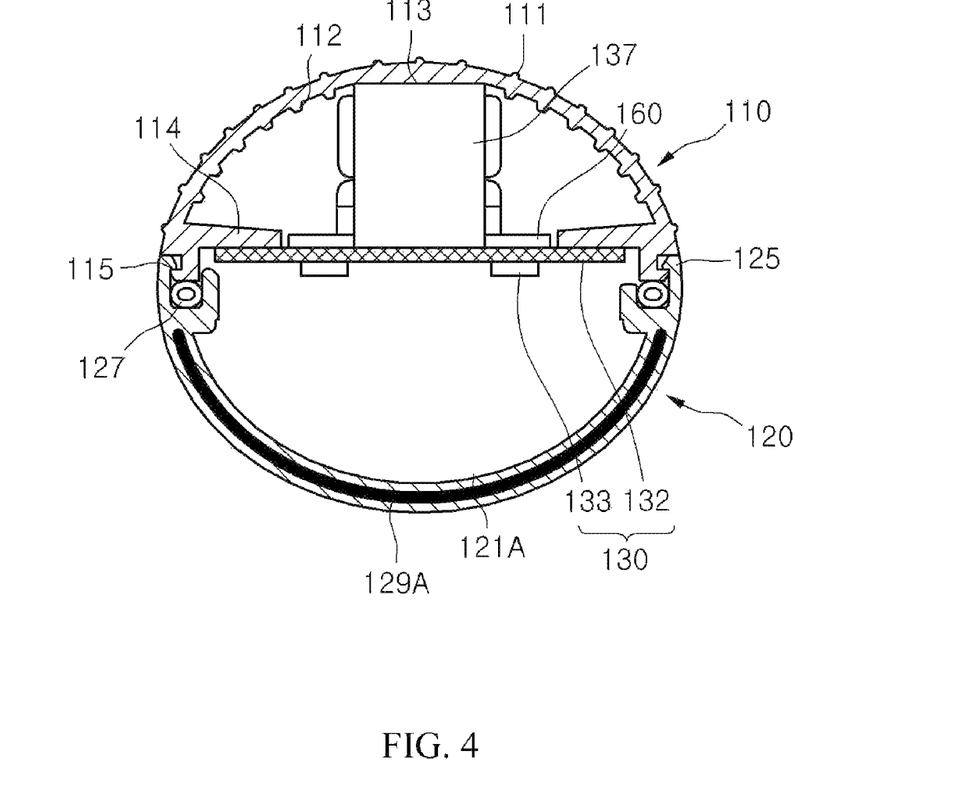
FIG. 4 is cross-sectional view illustrating a diffusion sheet provided to the fluorescent lamp type light emitting apparatus of FIG. 3, according to an embodiment.

FIG. 4 is a cross-sectional view illustrating a diffusion sheet 129A provided to the second cover 120 of FIG. 3, according to another embodiment.

Referring to FIG. 4, a insertion hole 121A, having a hemispheric shape or a half-cylindrical shape, is disposed in the second cover 120 in the longitudinal direction of the second cover 120, and the diffusion sheet 129A is inserted into the insertion hole 121A. Since the diffusion sheet 129A is disposed in the second cover 120, an additional coupling process for the diffusion sheet 129A is not required.

Figure 5:
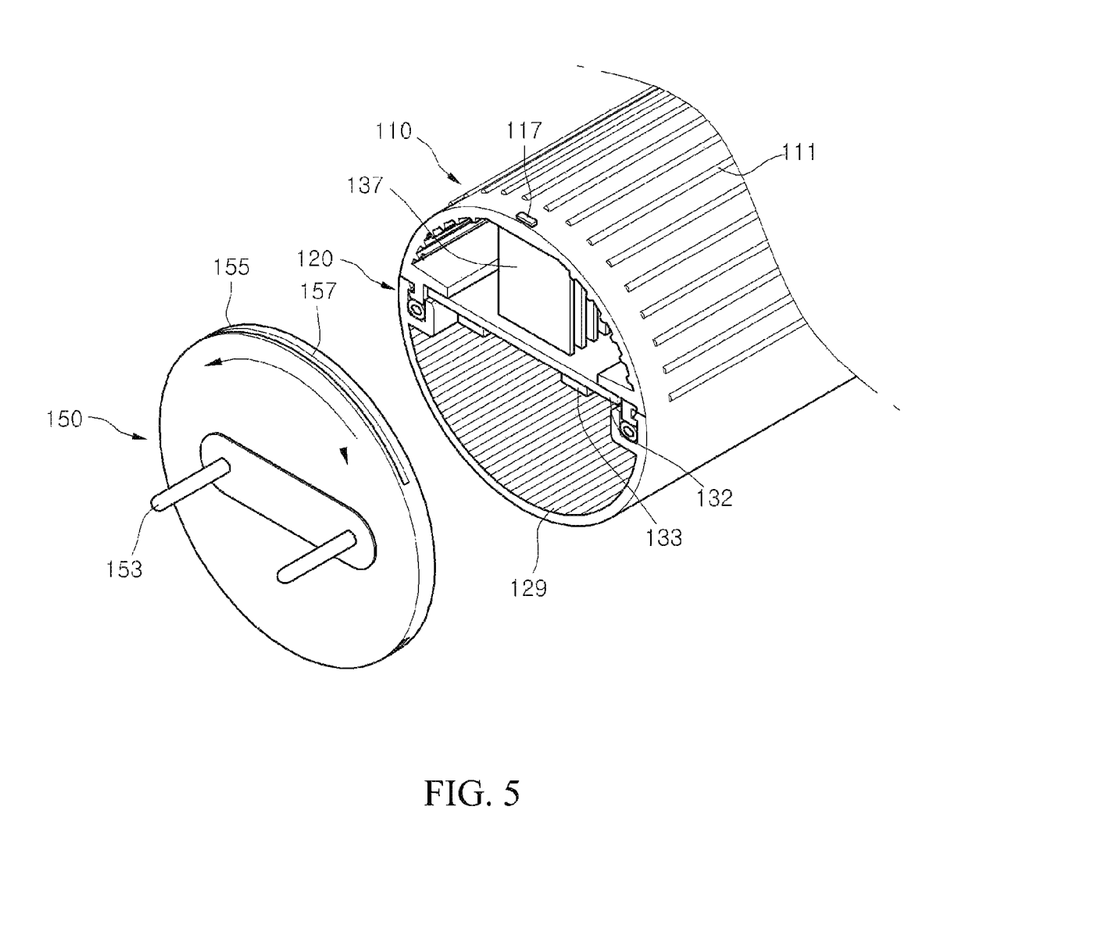
FIG. 5 is a schematic view illustrating a structure for rotating a first cover and a second cover according to an embodiment.

FIG. 5 is a schematic view illustrating a structure for rotating the first cover 110 and the second cover 120 according to an embodiment.

Referring to FIG. 5, rotation guide protrusions 117 are provided at both ends of the first cover 110 on the outer circumference of the first cover 110, and rotation guide holes 157 are provided at the cover guides 155 of the cap parts 150.

When the cap parts 150 are coupled to both the ends of the first cover 110 and the second cover 120, the rotation guide protrusions 117 of the first cover 110 are fitted into the rotation guide holes 157 of the cap parts 150.

The rotation guide protrusions 117 may be provided to the second cover 120, and the rotation guide holes 157 may be further provided to the lower side of the cap parts 150. The cover formed of the first cover 110 and the second cover 120 rotates along the cap parts 150.

The electrode terminals 153 of the cap parts 150 may be coupled to the socket for a fluorescent lamp. In this case, the cap parts 150 are fixed, and the first cover 110 and the second cover 120 may be rotatable relative to the fixed cap parts 150 within a predetermined angle (e.g. 0<rotation angle<+90° or −90°) through the rotation guide protrusions 117 and the rotation guide holes 157. Accordingly, the direction of light emitted from the light emitting apparatus 100 may be adjusted within about +90° or −90°.

Although a lock structure of the rotation guide protrusions 117 and the rotation guide holes 157 is used to rotate the light emitting apparatus 100, a thread member, or a bearing member may be used to rotate the light emitting apparatus 100.

Figure 6:
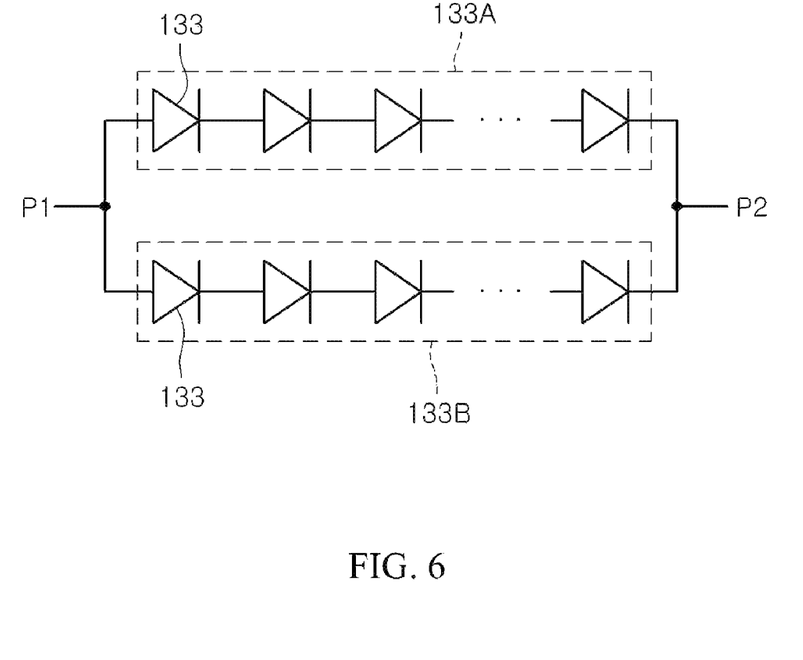
FIG. 6 is a circuit diagram of light emitting diode arrays according to an embodiment.

FIG. 6 is a circuit diagram of first and second light emitting diode arrays 133A and 133B according to an embodiment.

Referring to FIG. 6, a light emitting module comprises the first and second light emitting diode arrays 133A and 133B.

The first and second light emitting diode arrays 133A and 133B comprising the light emitting diodes 133 are connected to each other in parallel in a forward direction with respect to power terminals P1 and P2. The number of the light emitting diodes 133 connected to the light first and second emitting diode arrays 133A and 133B may be adjusted according to socket size, luminous intensity, or input power.

The light emitting diode arrays 133A and 133B may emit lights having different color temperatures from each other. For example, the first light emitting diode array 133A emits white light having a color temperature ranging from about 5000 to 8000K, and the second light emitting diode array 133B emits white light having a color temperature ranging from about 2000 to 3000K.

The first and second light emitting diode arrays 133A and 133B have different correlated color temperatures (CCTs) from each other to vary a mixed color thereof. In this case, a color temperature is varied between about 2000 and 8000 K by mixing correlated color temperatures of the first and second light emitting diode arrays 133A and 133B and by controlling optical output of the light emitting diodes 133.

Figure 7:
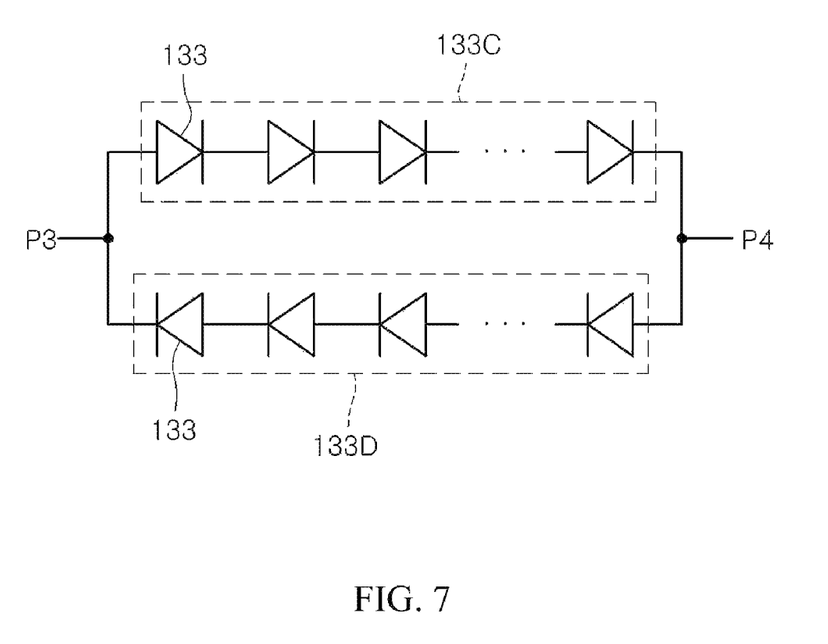
FIG. 7 is a circuit diagram of light emitting diode arrays according to another embodiment.

FIG. 7 is a circuit diagram of first and second light emitting diode arrays 133C and 133D according to another embodiment.

Referring to FIG. 7, the first and second light emitting diode arrays 133C and 133D may be connected in parallel in a reverse direction with respect to power terminals P3 and P4. The first and second light emitting diode arrays 133C and 133D in parallel in the reverse direction are sequentially driven by AC power. The number of light emitting diodes connected to the first and second light emitting diode arrays 133C and 133D may be adjusted according to the AC power and a driving voltage.

The power terminals P3 and P4 may be connected to a resistor or a rectifier circuit, but are not limited thereto.

Figure 8:
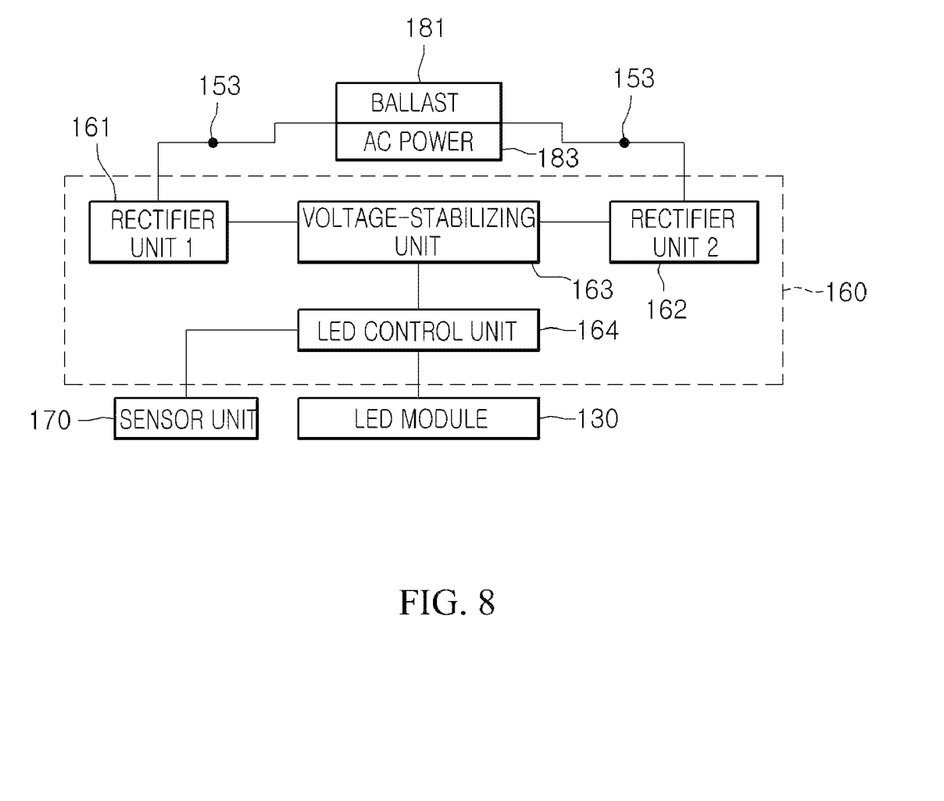
FIG. 8 is a block diagram of a light emitting apparatus according to an embodiment.

FIG. 8 is a block diagram of a fluorescent lamp type light emitting apparatus according to an embodiment.

Referring to FIG. 8, the control module 160 may receive power from a ballast 181 or an AC power terminal 183. The control module 160 may receive a constant current through the ballast 181 connected to a socket for a fluorescent lamp, or receive current directly from the AC power terminal 183 without the ballast 181.

The control module 160 comprises a first rectifier unit 161, a second rectifier unit 162, a voltage-stabilizing unit 163, and an LED control unit 164.

The first and second rectifier units 161 and 162 may be provided with a bridge rectifier circuit, and rectify the input power of the ballast 181 or the AC power terminal 183 into DC power. The rectifier circuit of the first and second rectifier units 161 and 162 may comprise a rectifier diode, a condenser, and a resistor, but is not limited thereto.

The voltage-stabilizing unit 163 stabilizes DC power input through the first and second rectifier units 161 and 162 into a desired constant power, and then supplies the desired constant power to the LED control unit 164.

The LED control unit 164 may convert voltage input from the voltage-stabilizing unit 163 into phase current, and provide the phase current to the light emitting module 130 to drive the light emitting diodes.

A sensor unit 170 is disposed at a predetermined position in a cover of a fluorescent lamp type light emitting apparatus. The sensor unit 170 may be disposed under the circuit board 132 of FIG. 1, or at a position adapted for receiving light. The sensor unit 170, as an optical sensor, senses information about the intensity or amount of light emitted from the light emitting diodes 133 of FIG. 1. The sensor unit 170 transmits the information of light emitted from the light emitting diodes 133 to the LED control unit 164, and the LED control unit 164 controls brightnesses and colors of the light emitting diodes 133. That is, the LED control unit 164 controls dimming of the light emitting diodes 133 by using optical information.

According to another embodiment, an infrared unit or Bluetooth may be provided, which may function as a switch for remotely controlling on/off of the fluorescent lamp type light emitting apparatus.

According to an embodiment, the fluorescent lamp type light emitting apparatus comprising the LEDs can use the socket for a fluorescent lamp, as a power terminal. According to the embodiment, the light emitting apparatus can be driven by AC power without a ballast, so as to avoid limitations due to installation of a ballast.

According to an embodiment, color temperatures of the LEDs can be varied to make users feel more comfortable than related art fluorescent lamps.

According to an embodiment, light of the light emitting apparatus is sensed to control dimming thereof.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting unit comprising:
a first cover;
a second cover coupled to the first cover;
a light emitting module comprising a circuit board and a light emitting diode on the circuit board; and
a plurality of radiation pads disposed on the light emitting module;
wherein the first cover comprises a support extended from an inner surface of the first cover,
wherein the first cover is fixed to the light emitting module and releases heat from the light emitting module,
wherein the plurality of radiation pads are thermally in contact with both the circuit board and an inner circumference of the first cover so as to release heat generated from the circuit board,
wherein the plurality of radiation pads comprise at least two radiation plates,
wherein at least two of the radiation plates are parallel to each other,
wherein one end of each of the radiation pads is in contact with the inner circumference of the first cover, and
wherein one end of each of the at least two radiation plates is in contact with the inner circumference of the first cover.

2. The light emitting unit according to claim 1, wherein the first cover comprises a body in which a cross section is an arc such that a cross section of the first cover and the second cover is a circle.

3. The light emitting unit according to claim 2, wherein the support is extended from the inner surface of the body of the first cover to a direction of an inner side of the circle.

4. The light emitting unit according to claim 2, wherein the body of the first cover comprises a plurality of heat sink pins.

5. The light emitting unit according to claim 1, wherein the plurality of radiation pads stand substantially perpendicular to the circuit board so as to be in contact with the inner surface of the first cover.

6. The light emitting unit according to claim 5, wherein a place where the plurality of radiation pads are in contact with the inner surface of the first cover is substantially at the center of the first cover.

7. The light emitting unit according to claim 1, further comprising a cap part including a guide being in contact with outer surfaces of the first cover and the second cover,
wherein the cap part includes the guide coupled to both ends of the first cover and the second cover, a groove on the guide, and a terminal.

8. The light emitting unit according to claim 7, wherein the first cover comprises a protrusion at an edge and the protrusion is coupled with the groove.

9. The fight emitting unit of claim 1, wherein at least one of the first cover and the second cover comprises a half-cylindrical cover.

10. The light emitting unit of claim 1, further comprising a coupling groove formed in correspondence with each other at both edges of the first cover and the second cover.

11. The light emitting unit of claim 1, wherein the first cover comprises a metal and heat sink pins having a concavoconvex structure formed on inner and outer surfaces of the first cover.

12. The light emitting unit of claim 1, wherein the circuit board vertically overlaps both the support of the first cover and the plurality of radiation pads.

13. A light emitting unit comprising:
a first cover;
a second cover coupled to the first cover;
a light emitting module comprising a circuit board and a light emitting diode on the circuit board; and
a plurality of radiation pads disposed on the light emitting module;
wherein the first cover comprises a support extended from an inner surface of the first cover,
wherein the first cover is fixed to the light emitting module and releases heat from the light emitting module,
wherein the plurality of radiation pads are thermally in contact with both the circuit board and an inner circumference of the first cover so as to release heat generated from the circuit hoard,
wherein one end of each of the radiation pads is in contact with the inner circumference of the first cover, and
wherein the circuit board is directly in contact with both the support of the first cover and the plurality of radiation pads.

14. The light emitting unit of claim 1, wherein the plurality of radiation pads have a width less than that of the circuit board.

15. The light emitting unit according to claim 1, wherein the plurality of radiation pads comprise at least two radiation plates and the at least two radiation plates are spaced at a predetermined distance from each other.

* * * * *